(12) United States Patent
Hills

(10) Patent No.: US 12,285,905 B2
(45) Date of Patent: Apr. 29, 2025

(54) METHODS OF FORMING A DECORATIVE PANEL

(71) Applicant: THE BOEING COMPANY, Arlington, VA (US)

(72) Inventor: Karen L. Hills, Everett, WA (US)

(73) Assignee: The Boeing Company, Arlington, VA (US)

( * ) Notice: Subject to any disclaimer, the term of this patent is extended or adjusted under 35 U.S.C. 154(b) by 146 days.

(21) Appl. No.: 18/180,346

(22) Filed: Mar. 8, 2023

(65) Prior Publication Data

US 2024/0300166 A1   Sep. 12, 2024

(51) Int. Cl.

| B29C 63/00 | (2006.01) |
| B29C 63/02 | (2006.01) |
| B29C 65/18 | (2006.01) |
| B29K 101/12 | (2006.01) |
| B29K 105/12 | (2006.01) |
| B29K 307/04 | (2006.01) |
| B29L 7/00 | (2006.01) |
| B29L 31/00 | (2006.01) |

(52) U.S. Cl.
CPC ...... B29C 63/0065 (2013.01); B29C 63/0017 (2013.01); B29C 63/02 (2013.01); B29C 65/18 (2013.01); B29K 2101/12 (2013.01); B29K 2105/12 (2013.01); B29K 2307/04 (2013.01); B29L 2007/002 (2013.01); B29L 2031/722 (2013.01)

(58) Field of Classification Search
CPC .. B29C 63/0065; B29C 63/0017; B29C 63/02
See application file for complete search history.

(56) References Cited

U.S. PATENT DOCUMENTS

| 11,298,870 | B2 | 4/2022 | Hills | |
| 11,459,128 | B2* | 10/2022 | Keller | ........... B64G 1/44 |
| 2001/0031238 | A1* | 10/2001 | Omaru | ........... D01F 11/12 |
| | | | | 423/447.2 |
| 2012/0015176 | A1 | 1/2012 | Riebel | |
| 2023/0047741 | A1* | 2/2023 | Wambaugh | ........ C04B 22/165 |

FOREIGN PATENT DOCUMENTS

| DE | 102015109597 | 1/2017 |
| EP | 3000593 | 12/2020 |

OTHER PUBLICATIONS

Extended European Search Report for EP App. No. 24152310.9-1014, dated Jun. 25, 2024.

* cited by examiner

*Primary Examiner* — Jacob T Minskey
*Assistant Examiner* — Wayne K. Swier
(74) *Attorney, Agent, or Firm* — Joseph M. Butscher; The small Patent Law Group LLC

(57) ABSTRACT

A method of forming a decorative panel includes pressing a decorative layer in relation to a substrate. The decorative layer includes one or more decorative elements, such as one or more of coloration, text, graphics, or the like.

20 Claims, 4 Drawing Sheets

METHODS OF FORMING A DECORATIVE PANEL

FIELD OF THE DISCLOSURE

Examples of the present disclosure generally relate to methods of forming a decorative panel, such as can be installed within an interior cabin of a vehicle.

BACKGROUND OF THE DISCLOSURE

Various structures are formed from composite materials. For example, portions of aircraft may be formed from composite materials. The composite material may be or include a polymer matrix reinforced with fibers. Known fibers include glass, carbon, basalt, aramid, or the like.

Internal cabins of aircraft may include numerous composite panels. As examples, sidewalls and doorway liners within an internal cabin can be formed from composite panels. Certain portions of the panels may include decorative aspects, such as colored portions, texts, graphics, and/or the like.

Panels configured for use within internal cabins are typically manufactured using a crushed core process, after which the panels are trimmed. Next, the panels are sprayed with an adhesive, which can include methyl ethyl ketone (MEK). After the adhesive is applied, a decorative laminate is vacuum formed on the panel.

As can be appreciated, the process of forming a panel with a decorative aspect is complex in that it requires numerous steps. Further, the process is typically time and labor intensive.

SUMMARY OF THE DISCLOSURE

A need exists for a simple and efficient method of forming a panel having one or more decorative aspects.

With that need in mind, certain examples of the present disclosure provide a method of forming a decorative panel. The method includes pressing a decorative layer in relation to a substrate. The decorative layer includes one or more decorative elements.

In at least one example, the substrate includes a main body including a thermoplastic base material having a plurality of fibers (such as carbon or Kevlar fibers) therein. As a further example, the main body includes a plurality of plies of the thermoplastic base material having the plurality of carbon fibers.

In at least one example, the decorative layer further includes a thermoplastic material. The one or more decorative elements show through the thermoplastic material. In at least one example, the decorative layer is devoid of fibers. The decorative layer can be a single ply of the thermoplastic material. In at least one example, the thermoplastic material is white.

The one or more decorative elements can be or otherwise include one or more of a coloration, text, or a graphic.

In at least one example, the method also includes forming the one or more decorative elements on or within the decorative layer through dye sublimation.

In at least one example, the method includes disposing the decorative layer on the substrate to form an initial assembly. The method can also include pre-heating the initial assembly before said pressing. The method can also include applying heat during said pressing.

In at least one example, the method is devoid of use of an adhesive. In at least one example, the method is devoid of vacuum forming.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a method of forming a panel having one or more decorative aspects. The method includes allowing decorative elements to be co-molded with a substrate. The method eliminates, minimizes, or otherwise reduces the need of any adhesive, such as an MEK-based adhesive. In at least one aspect, the method and resulting panel are devoid of any adhesive. The method also eliminates, minimizes, or otherwise reduces the need for a secondary process of vacuum forming a decorative laminate. In at least one example, the method is devoid of a vacuum forming step.

Figure 1:
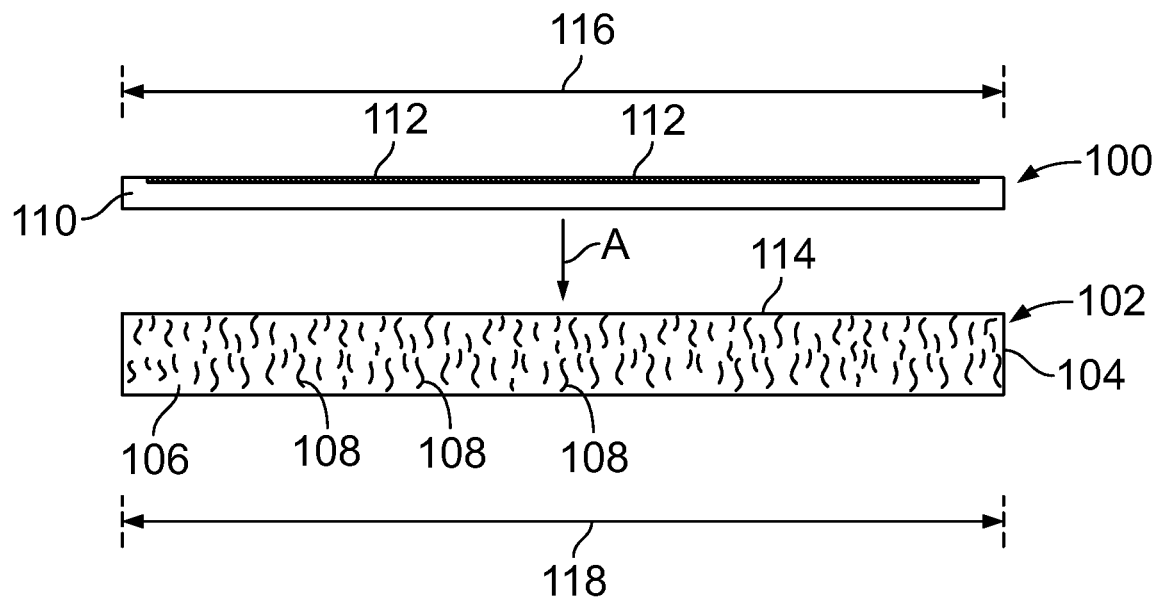
FIG. 1 illustrates a simplified lateral view of a decorative layer disposed over a substrate, according to an example of the present disclosure.

FIG. 1 illustrates a simplified lateral view of a decorative layer 100 disposed over a substrate 102, according to an example of the present disclosure. The substrate 102 includes a main body 104 formed of a carbon-reinforced thermoplastic. For example, the main body 104 can be formed of carbon-reinforced polyetherimide (PEI), polyphenylene sulfide (PPS), or the like, The main body 104 includes a thermoplastic base material 106 having a plurality of fibers 108 (such as carbon or Kevlar fibers) therein. For example, the carbon fibers 108 are dispersed throughout the thermoplastic base material 106. In at least one example, the main body 104 includes a plurality of plies of the carbon-reinforced thermoplastic, such as two, three or more plies of the carbon-reinforced thermoplastic.

The decorative layer 100 includes a thermoplastic material 110. In at least one example, the thermoplastic material 110 is the same material as the thermoplastic base material 106 of the substrate 102. In contrast to the substrate 102, the thermoplastic material 110 does not include fibers (such as carbon or Kevlar fibers). That is, the thermoplastic material 110 is not carbon-reinforced. The thermoplastic material 110 is devoid of carbon fibers. Alternatively, the thermoplastic material 110 can include at least one carbon fibers at one or more locations.

The decorative layer 100 can be a single ply of the thermoplastic material 110. In at least one example, the thermoplastic material 110 is white. The white color of the thermoplastic material 110 allows one or more decorative elements 112 to show through the thermoplastic material 110. In at least one example, the decorative layer 100 is devoid of carbon fibers, and the thermoplastic material 110 is white so that the white thermoplastic layer provides a background for the decorative elements 112 to be deposited without carbon fibers showing.

The decorative elements 112 provide one or more decorative aspects. Examples of the decorative elements 112 include a coloration, text, a graphic, and/or the like. The decorative elements 112 show through the thermoplastic material 110.

In at least one example, the decorative elements 112 are formed on and/or within the decorative layer 100 through dye sublimation. For example, the decorative elements 112 are disposed on or within the thermoplastic material 110. In dye sublimation, a transfer dye (which forms the decorative elements 112) is transferred onto the thermoplastic material through heating. For example, the decorative elements 112 are first printed onto a transfer paper, such as using a sublimation printer and inks. Next, a heat press is used to transfer the decorative elements 112 onto the thermoplastic material 110. Optionally, the decorative elements 112 can be disposed on the thermoplastic material through other processes, such as ink or laser printing.

In order to form a decorative panel, the decorative layer 100 is urged onto and over a surface 114 of the substrate 102 in the direction of arrow A. The surface 114 is configured to be exposed, such as within an interior cabin of a vehicle. For example, the surface 114 can be an interior exposed surface of a sidewall, a ceiling, a door liner, a valance, a portion of a monument, or the like. In at least one example, a perimeter 116 of the decorative layer 100 is the same as the perimeter 118 of the substrate 114. The decorative layer 100 can be axially aligned with the substrate 114 so that no portion of the decorative layer 100 extends past a portion of the perimeter 118 of the substrate 114. In at least one other example, the perimeter 116 of the decorative layer 100 is less than the perimeter 118 of the substrate 102, and the decorative layer 100 fits within a perimeter 118 of the substrate 118.

An initial assembly is formed by the decorative layer 100 overlaying the substrate 102. The initial assembly can be secured and contained within a frame, for example. Optionally, a frame may not be used.

Figure 2:
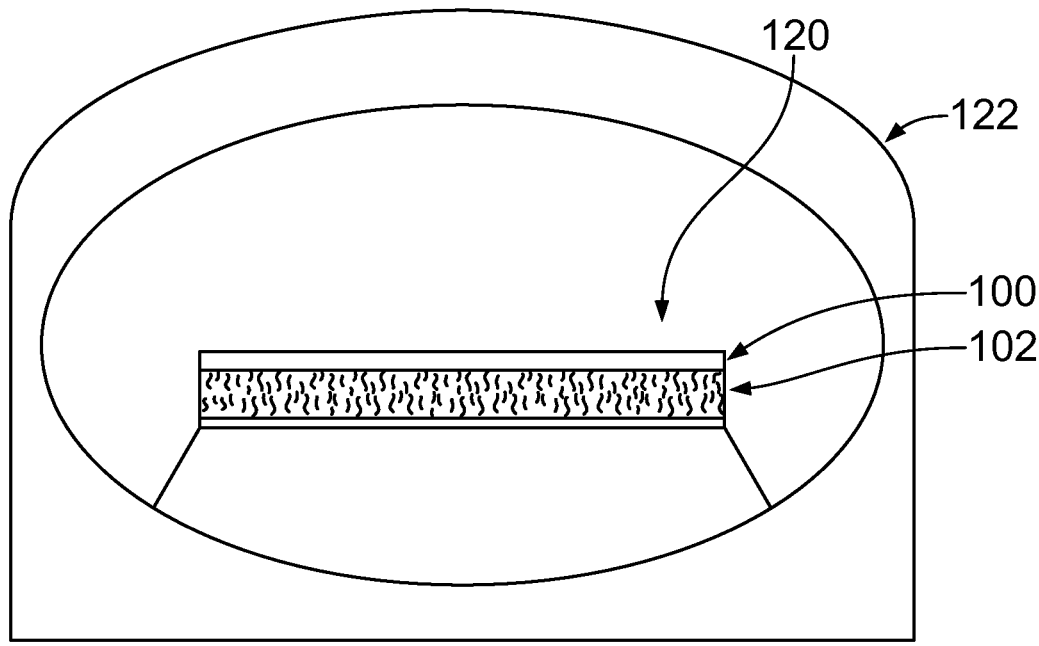
FIG. 2 illustrates a simplified view of an initial assembly within an oven, according to an example of the present disclosure.

FIG. 2 illustrates a simplified view of an initial assembly 120 within an oven 122, according to an example of the present disclosure. Referring to FIGS. 1 and 2, the initial assembly 120 includes the decorative layer 100 disposed on the surface 114 of the substrate 102. The initial assembly 120 can be placed within the oven 122. The initial assembly 120 is then pre-heated. For example, the oven 122 can be operated to pre-heat the initial assembly 120 at a temperature between 500°-700° F. for a pre-heating period, such as between 1-5 minutes. Alternatively, the initial assembly 120 is not pre-heated.

In at least one example, the initial assembly 120 is placed within the oven 122, and pre-heated at a temperature within a range of 500°-700° F. for 1-5 minutes. After the pre-heating period, the initial assembly 120 is then disposed within a press, which then exerts a pressing force into the initial assembly 120 for 1-3 minutes, while the initial assembly 120 is being heated at a temperature in the range of 350°-500° F., after which the fully formed decorative panel is removed.

Figure 3:
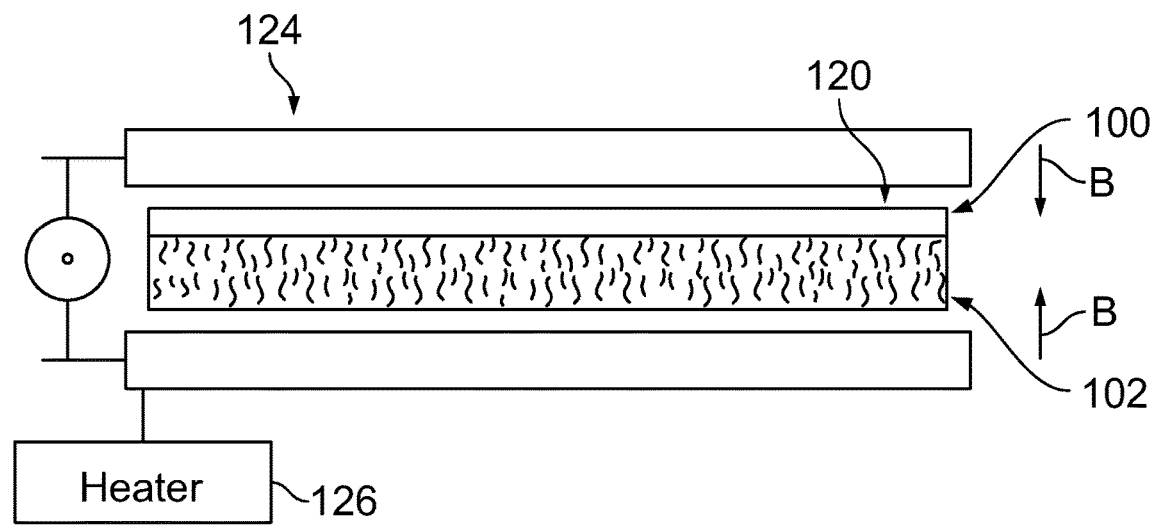
FIG. 3 illustrates a simplified view of the initial assembly within a press, according to an example of the present disclosure.

FIG. 3 illustrates a simplified view of the initial assembly 120 within a press 124, according to an example of the present disclosure. After the initial assembly 120 is formed, the initial assembly 120 is disposed within the press 124, which exerts a stamp press force that presses the decorative layer 100 onto and/or into substrate 102 in the directions of arrows B. In at least one example, the press 124 is configured as a forming tool, as described in U.S. Pat. No. 11,298,870, entitled "Methods for Forming Composite Panels," which is hereby incorporated by reference in its entirety. Optionally, other types of forming tools can be used to stamp press the decorative layer 100 onto and/or into the substrate 102.

As noted, the initial assembly 120 can be pre-heated before being disposed within the press 124. The press 124 can also include a heater 126 that is configured to heat the initial assembly 120 within the press 124. The press 124 exerts a pressure into the initial assembly 120 to press the decorative layer 100 onto and/or into the substrate 102. For example, the press 124 can exert a pressure into the initial assembly 120 of 100-200 pounds per square inch (psi) for a period of 1-2 minutes. During this time, the heater 126 can be operated to exert heat at a temperature of 375°-425°. Alternatively, the initial assembly 120 is not heated during as it is being pressed in the directions of arrows B by the press 124.

Figure 4:
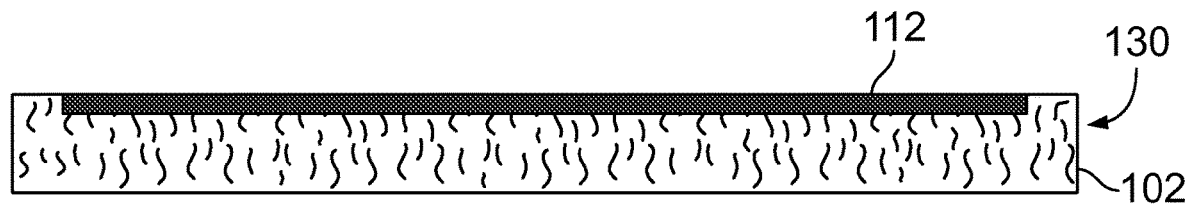
FIG. 4 illustrates a simplified lateral view of a decorative panel, according to an example of the present disclosure.

FIG. 4 illustrates a simplified lateral view of a decorative panel 130, according to an example of the present disclosure. Referring to FIGS. 3 and 4, the press 124 operates to press the decorative layer 100 in relation to (such as onto and/or into) the substrate 102 to form the decorative panel 130 that includes the decorative elements 112 integrally formed with the substrate 102. The decorative layer 100 (shown in FIGS. 1-3) is integrally pressed into and formed with the substrate 102 by the press 124.

Figure 5:
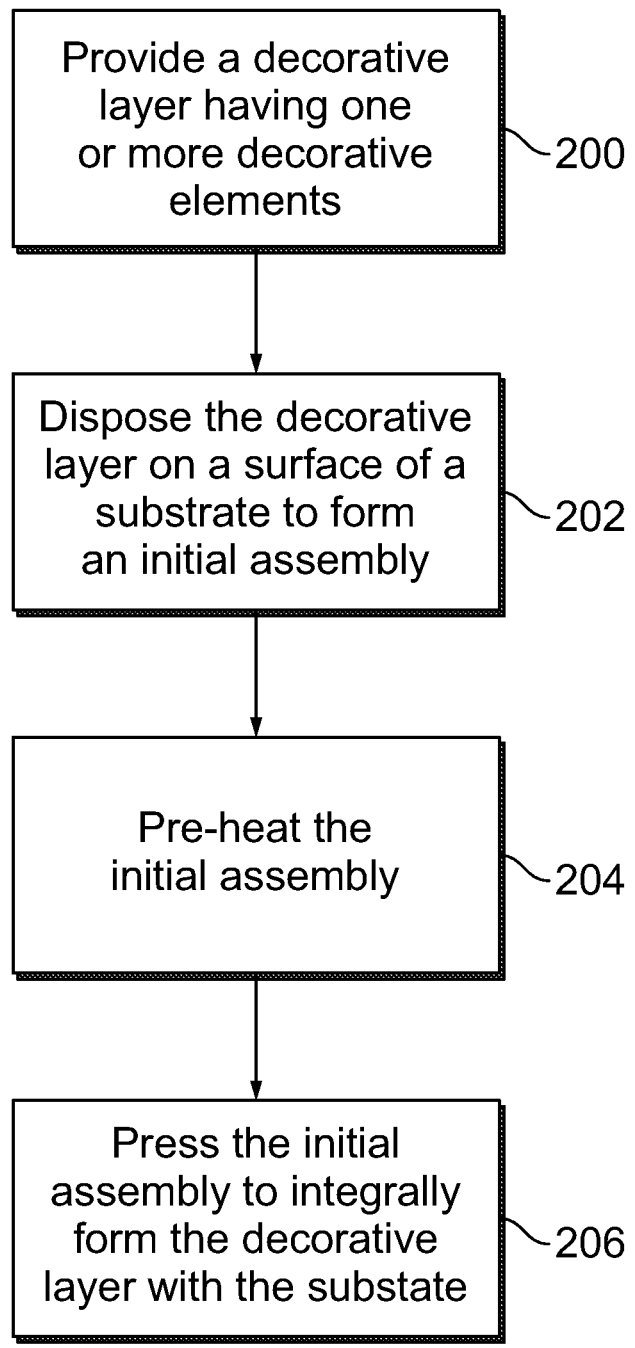
FIG. 5 illustrate a method of forming a decorative panel, according to an example of the present disclosure.

FIG. 5 illustrate a method of forming a decorative panel, according to an example of the present disclosure. Referring to FIGS. 1-5, at 200, the decorative layer 100 having the decorative elements 112 is provided. For example, the decorative elements 112 can be formed within the thermoplastic material 110 through dye sublimation.

At 202, the decorative layer 100 is disposed on the surface 114 of the substrate 102 to form the initial assembly 120. At 204, the initial assembly 120 is pre-heated. Optionally, the method may not include step 204.

At 206, the initial assembly 120 is pressed to integrally form the decorative layer 100 with the substrate 102. The initial assembly 120 can be heated during the pressing step 206. That is, the method can also include applying heat during the pressing step 206. Optionally, the initial assembly 120 is not heated during the pressing step 206.

The initial assembly 120 is pressed to form the decorative panel 130. The decorative panel 130 is formed without an adhesive. For example, an adhesive is not applied to either the decorative layer 100 or the substrate 102.

As described herein, the method of forming the decorative panel 130 includes pressing the decorative layer 100 in relation to (for example, onto and/or into) the substrate 102. The decorative layer 100 includes the decorative element(s) 112.

The methods described herein provide simple, efficient, and effective processes that reduce material and tooling costs. The methods eliminate, minimize, or otherwise reduce the need for adhesives, such as MEK-based adhesives. Further, the resulting decorative panel 130 is lighter than panels formed through secondary processes that include securing an additional decorative panel to a substrate panel.

The methods described herein allow for a decorative layer to be co-molded with a part, such as a substrate. In at least one example, the methods eliminate the need for MEK-based adhesives and a secondary process of vacuum forming a decorative laminate. The decorative panel 130 can be efficiently formed in a single step via a stamp-forming process.

Figure 6:
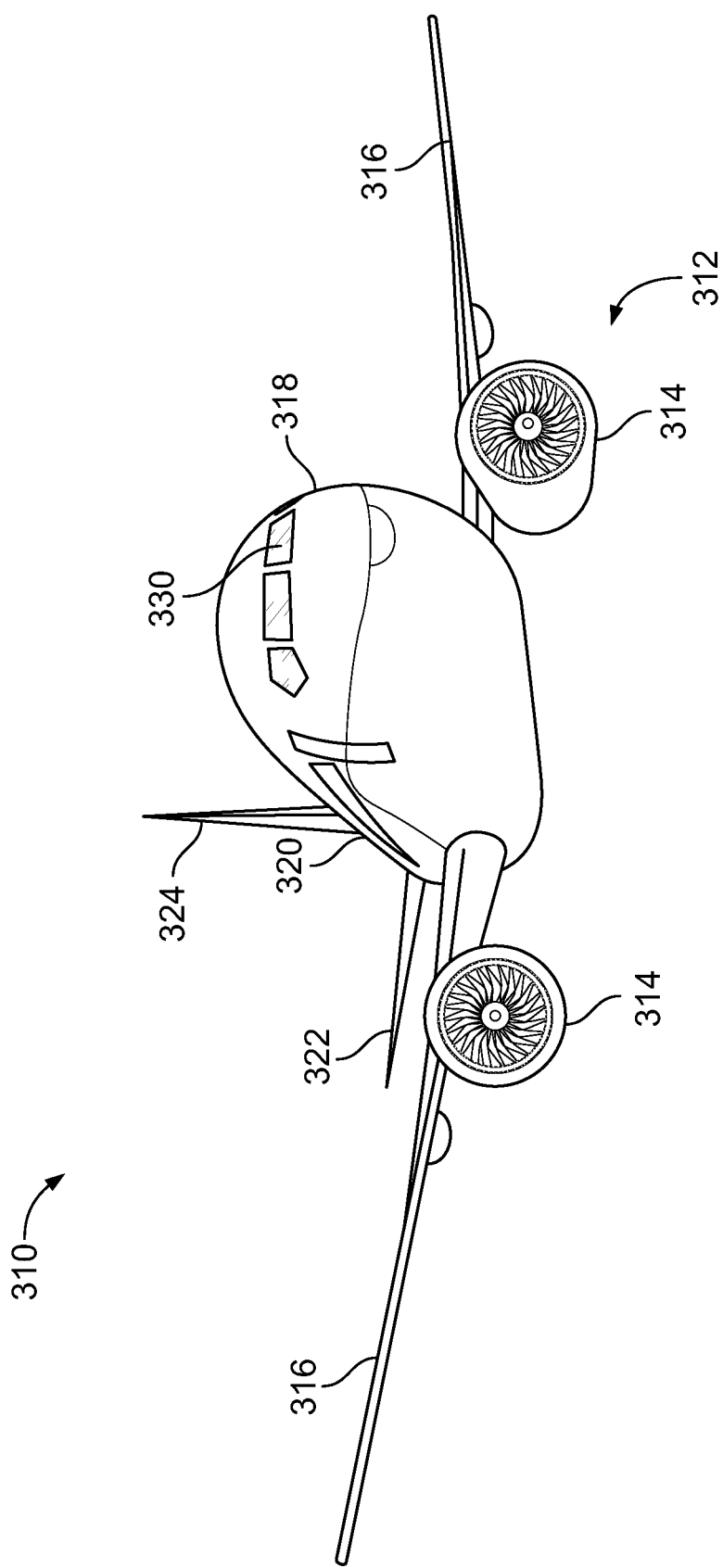
FIG. 6 illustrates a perspective front view of a vehicle, according to an example of the present disclosure.

FIG. 6 illustrates a perspective top view of a vehicle, such as an aircraft 300, according to an example of the present disclosure. The aircraft 300 includes a propulsion system 312 that includes two engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324.

The fuselage 318 of the aircraft 300 defines an internal cabin 330, which may be defined by interior sidewall panels that connect to a ceiling and a floor. The internal cabin 330 may include a cockpit, one or more work sections (for example, galleys, personnel carry-on baggage areas, and the like), one or more passenger sections (for example, first class, business class, and economy sections), and an aft section. Overhead stowage bin assemblies may be positioned throughout the internal cabin. Various portions of the internal cabin, including sidewall panels, the ceiling, the floor, the stowage bin assemblies, and the like may be formed by decorative panels, such as shown and described herein.

Alternatively, instead of an aircraft, examples of the present disclosure may be used with various other vehicles, such as automobiles, buses, locomotives and train cars, seacraft, spacecraft, and the like. As another example, examples of the present disclosure may be used with fixed structures, such as within residential or commercial buildings.

Further, the disclosure comprises examples according to the following clauses:

Clause 1. A method of forming a decorative panel, the method comprising:
pressing a decorative layer in relation to a substrate, wherein the decorative layer comprises one or more decorative elements.

Clause 2. The method of Clause 1, wherein the substrate comprises a main body including a thermoplastic base material having a plurality of carbon fibers therein.

Clause 3. The method of Clause 2, wherein the main body includes a plurality of plies of the thermoplastic base material having the plurality of carbon fibers.

Clause 4. The method of any of Clauses 1-3, wherein the decorative layer further comprises a thermoplastic material, wherein the one or more decorative elements show through the thermoplastic material.

Clause 5. The method of Clause 4, wherein the decorative layer is devoid of carbon fibers.

Clause 6. The method of Clauses 4 or 5, wherein the decorative layer is a single ply of the thermoplastic material.

Clause 7. The method of any of Clauses 4-6, wherein the thermoplastic material is white.

Clause 8. The method of any of Clauses 1-7, wherein the one or more decorative elements comprise one or more of a coloration, text, or a graphic.

Clause 9. The method of any of Clauses 1-8, further comprising forming the one or more decorative elements on or within the decorative layer through dye sublimation.

Clause 10. The method of any of Clauses 1-9, further comprising disposing the decorative layer on the substrate to form an initial assembly.

Clause 11. The method of Clause 10, further comprising pre-heating the initial assembly before said pressing.

Clause 12. The method of any of Clauses 1-11, further comprising applying heat during said pressing.

Clause 13. The method of any of Clauses 1-12, wherein the method is devoid of use of an adhesive.

Clause 14. The method of any of Clauses 1-13, wherein the method is devoid of vacuum forming.

Clause 15. A method of forming a decorative panel, the method comprising:
forming one or more decorative elements on or within a decorative layer through dye sublimation, wherein the one or more decorative elements comprise one or more of a coloration, text, or a graphic;
disposing the decorative layer on a substrate to form an initial assembly;
pre-heating the initial assembly; and
after said pre-heating, pressing the decorative layer in relation to a substrate.

Clause 16. The method of Clause 15, wherein the substrate comprises a main body including a plurality of plies of thermoplastic base material having a plurality of carbon fibers therein.

Clause 17. The method of Clauses 15 or 16, wherein the decorative layer comprises a thermoplastic material, wherein the one or more decorative elements show through the thermoplastic material, wherein the decorative layer is devoid of carbon fibers, wherein the decorative layer is a single ply of the thermoplastic material, and wherein the thermoplastic material is white.

Clause 18. The method of any of Clauses 15-17, further comprising applying heat during said pressing.

Clause 19. The method of any of Clauses 15-18, wherein the method is devoid of use of an adhesive, and wherein the method is devoid of vacuum forming.

Clause 20. A method of forming a decorative panel, the method comprising:
forming one or more decorative elements on or within a decorative layer through dye sublimation, wherein the one or more decorative elements are one or more of a coloration, text, or a graphic, wherein the decorative layer comprises a thermoplastic material, wherein the one or more decorative elements show through the thermoplastic material, wherein the decorative layer is devoid of carbon fibers, wherein the decorative layer is a single ply of the thermoplastic material, and wherein the thermoplastic material is white;
disposing the decorative layer on a substrate to form an initial assembly, wherein the substrate comprises a main body including a plurality of plies of thermoplastic base material having a plurality of carbon fibers therein;
pre-heating the initial assembly;
after said pre-heating, pressing the decorative layer in relation to a substrate; and
applying heat during said pressing,
wherein the method is devoid of use of an adhesive, and wherein the method is devoid of vacuum forming.

As described herein, examples of the present disclosure provide simple and efficient methods of forming a decorative panel having one or more decorative aspects.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method of forming a decorative panel, the method comprising:
   pressing a decorative layer in relation to a substrate, wherein the decorative layer is devoid of carbon fibers, and comprises:
   a thermoplastic material; and
   one or more decorative elements showing through the thermoplastic material.

2. The method of claim 1, wherein the substrate comprises a main body including a thermoplastic base material having a plurality of carbon fibers therein.

3. The method of claim 2, wherein the main body includes a plurality of plies of the thermoplastic base material having the plurality of carbon fibers.

4. The method of claim 1, wherein the decorative layer is a single ply of the thermoplastic material.

5. The method of claim 1, wherein the thermoplastic material is white.

6. The method of claim 1, wherein the one or more decorative elements comprise one or more of a coloration, text, or a graphic.

7. The method of claim 1, further comprising forming the one or more decorative elements on or within the decorative layer through dye sublimation.

8. The method of claim 1, further comprising disposing the decorative layer on the substrate to form an initial assembly.

9. The method of claim 8, further comprising pre-heating the initial assembly before said pressing.

10. The method of claim 1, further comprising applying heat during said pressing.

11. The method of claim 1, wherein the method is devoid of use of an adhesive.

12. The method of claim 1, wherein the method is devoid of vacuum forming.

13. A method of forming a decorative panel, the method comprising:
   forming one or more decorative elements on or within a decorative layer through dye sublimation, wherein the one or more decorative elements comprise one or more of a coloration, text, or a graphic, wherein the decorative layer comprises a thermoplastic material, wherein the one or more decorative elements show through the thermoplastic material, wherein the decorative layer is devoid of carbon fibers, wherein the decorative layer is a single ply of the thermoplastic material, and wherein the thermoplastic material is white;
   disposing the decorative layer on a substrate to form an initial assembly;
   pre-heating the initial assembly; and
   after said pre-heating, pressing the decorative layer in relation to a substrate.

14. The method of claim 13, wherein the substrate comprises a main body including a plurality of plies of thermoplastic base material having a plurality of carbon fibers therein.

15. The method of claim 13, further comprising applying heat during said pressing.

16. The method of claim 13, wherein the method is devoid of use of an adhesive, and wherein the method is devoid of vacuum forming.

17. A method of forming a decorative panel, the method comprising:
   forming one or more decorative elements on or within a decorative layer through dye sublimation, wherein the one or more decorative elements are one or more of a coloration, text, or a graphic, wherein the decorative layer comprises a thermoplastic material, wherein the one or more decorative elements show through the thermoplastic material, wherein the decorative layer is devoid of carbon fibers, wherein the decorative layer is a single ply of the thermoplastic material, and wherein the thermoplastic material is white;

disposing the decorative layer on a substrate to form an initial assembly, wherein the substrate comprises a main body including a plurality of plies of thermoplastic base material having a plurality of carbon fibers therein;

pre-heating the initial assembly;

after said pre-heating, pressing the decorative layer in relation to a substrate; and applying heat during said pressing, wherein the method is devoid of use of an adhesive, and wherein the method is devoid of vacuum forming.

18. The method of claim 17, wherein said pre-heating the initial assembly comprises pre-heating the initial assembly at a temperature within a range of 500°-700° F. for 1-5 minutes, wherein said pressing comprises pressing the decorative layer in relation to the substrate for 1-3 minutes at a pressure of 100-200 pounds per square inch, and wherein said applying heat during said pressing comprises heating the initial assembly at a temperature within a range of 350°-500° F.

19. The method of claim 1, wherein the substrate is formed of carbon-reinforced polyetherimide (PEI).

20. The method of claim 1, wherein the substrate is formed of polyphenylene sulfide (PPS).

* * * * *